United States Patent [19]
Skell et al.

[11] Patent Number: 5,550,369
[45] Date of Patent: Aug. 27, 1996

[54] TRIANGULATION POSITION DETECTION METHOD AND APPARATUS

[75] Inventors: Daniel G. Skell; Eric D. Skell, both of Cedarburg, Wis.

[73] Assignee: Electro-Pro, Inc., Cedarburg, Wis.

[21] Appl. No.: 202,792

[22] Filed: Feb. 28, 1994

[51] Int. Cl.$^6$ .......................... G01V 8/20; G01S 7/481; G01S 17/02; B67D 3/00
[52] U.S. Cl. ................... 250/222.1; 250/559.31; 250/223 B; 222/641
[58] Field of Search ................ 250/223 B, 222.1, 250/223 R, 221, 239, 559.31, 559.3, 559.29; 141/95, 198; 222/56, 640, 641, 644

[56] References Cited

U.S. PATENT DOCUMENTS

| | | |
|---|---|---|
| 3,045,445 | 7/1962 | MacLeod . |
| 3,367,128 | 2/1968 | Hosoda . |
| 3,727,056 | 4/1973 | Enemark .................. 250/239 |
| 3,731,496 | 5/1973 | Frazier . |
| 3,842,263 | 10/1974 | Kornrumpf et al. .......... 250/239 |
| 4,202,387 | 5/1980 | Upton . |
| 4,282,430 | 8/1981 | Hatten et al. .............. 250/221 |
| 4,306,147 | 12/1981 | Fukuyama et al. .......... 250/221 |
| 4,437,499 | 3/1984 | Devale ..................... 141/95 |
| 4,747,516 | 5/1988 | Baker ..................... 250/223 B |
| 4,822,996 | 4/1989 | Lind . |
| 4,973,834 | 11/1990 | Kim ....................... 250/221 |
| 5,002,102 | 3/1991 | Hösel . |
| 5,059,812 | 10/1991 | Huber . |
| 5,159,834 | 11/1992 | Eisele . |
| 5,164,606 | 11/1992 | Secord . |
| 5,245,177 | 9/1993 | Schiller .................. 250/221 |
| 5,250,801 | 10/1993 | Grozinger et al. .......... 250/223 B |

FOREIGN PATENT DOCUMENTS

| | | |
|---|---|---|
| 2554244 | 5/1985 | France . |
| 2633081 | 12/1989 | France . |
| 4013743 | 11/1991 | Germany . |

OTHER PUBLICATIONS

Feinwerktechnik und Messtechnik, vol. 97, No. 6, 1 Jun. 1989 Munchen, DE, pp. 162–264.

Primary Examiner—Edward P. Westin
Assistant Examiner—John R. Lee
Attorney, Agent, or Firm—Whyte Hirschboeck Dudek S.C.

[57] ABSTRACT

A method and apparatus is provided to detect the position of an object, such as a container, in a target window using the concept of triangulation of light radiation. A transmitter emits a pulse of light in response to a periodic clock pulse which is at least partially reflected off the container positioned in the target window and into a receiver, forming an optical triangle. The target window has the volumetric shape of two intersecting cones and therefore provides three axes detection. The signal produced by the receiver in response to receiving a light input is filtered to remove weak signals and checked to ensure that the light indicative signal is synchronous with the periodic clock pulse to eliminate errant light sources. The presence of a synchronous signal indicates the presence of an object in the target window wherein subsequent action may be taken, such as dispensing beverage and/or ice into a container within the target window.

44 Claims, 4 Drawing Sheets

CIRCUIT BLOCK DIAGRAM

SYSTEM FLOWCHART

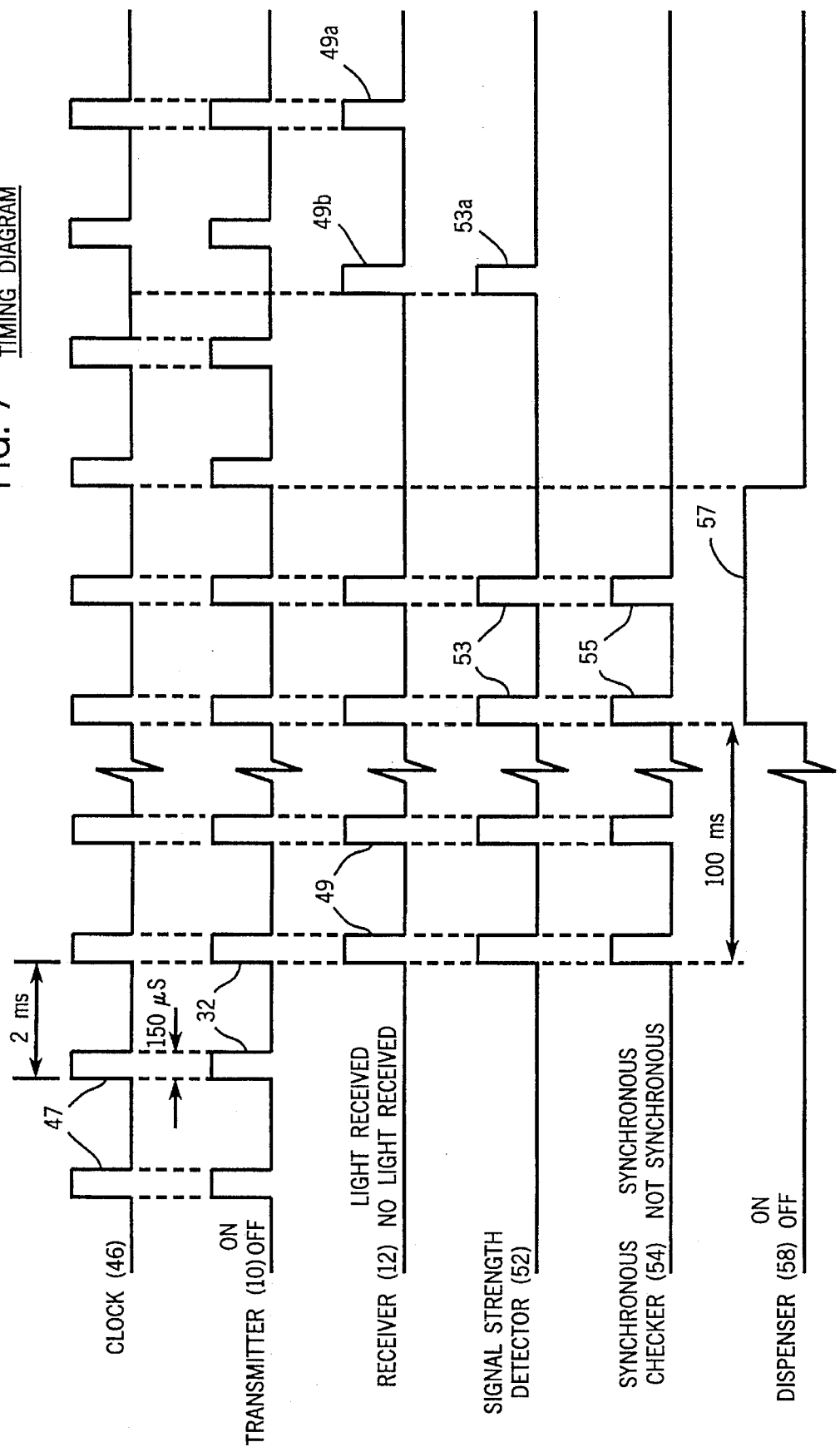

5,550,369

TRIANGULATION POSITION DETECTION METHOD AND APPARATUS

BACKGROUND OF THE INVENTION

The present invention relates generally to a triangulation position detection method and device for detecting the presence of an object within a predetermined target window using light radiation. More specifically, the invention is applied to a dispenser, such as a beverage and/or ice dispenser.

Generally, a beverage and ice dispenser consists of a mechanical push rod closing an electric switch or a manually operated push-button electric switch which actuates a dispenser to dispense product. It is thought that such dispensers transmit communicable diseases. For example, a person with such a disease who drinks out of a cup and returns to the dispenser to refill the cup must contact the cup to the dispensing push rod such that germs may be transferred from the cup to the push rod wherein the next individual to use the mechanical dispenser may come in contact with the germs by drinking from a cup subsequently placed against the same push rod.

Heat sensing devices which are typically used for activating water faucets in response to sensing heat generated by the operator's hand within a certain proximity of the faucet are not very accurate in determining position because of their temperature dependency. Heat sensing devices are activated when an object of a given temperature is at a certain proximity to the heat sensing device. However, if the temperature is lower than the temperature expected at the given proximity, the device will not be activated until the object with lower temperature is brought closer to the heat sensing device which shortens the expected proximity. In other words, an object's distance from the heat sensing device, to activate the device, will vary with temperature and therefore will not give precise and predictable results.

Another type of position sensing device is a light beam interrupter system in which a beam of infrared light is transmitted to a photodetector mounted opposite the infrared transmitter which transmits a steady light beam and wherein the interruption of the light beam indicates the presence of an object therebetween. For example, see U.S. Pat. No. 4,822,996 issued to Lind. This type of system is only capable of determining whether an object is present between the transmitter and the receiver and not the proximity or position of an object. In other words, this type of a detector would only function on a single axis.

An alternative transmitter and receiver arrangement was provided by Hösel, U.S. Pat. No. 5,002,102 which emits a steady beam of light from a transmitter which is reflected back to a receiver mounted adjacent the transmitter. The Hösel system requires a microcomputer with a microprocessor for calculating a distance between the transmitter/receiver and the fill level in a bin-the distance being an inverse function of the intensity of the light beam. The Hösel apparatus is based on direct reflection, that is, it simply emits light and determines how much is returned to determine the fill level distance and is therefore limited to detection on a single axis, and unless confined within a closed system such as the fiber storing bin disclosed by Hösel, the Hösel device would be susceptible to stray light sources and be inoperative in the presence of such stray light sources.

The main disadvantage of these prior systems is that they are limited to detection on a single axis and therefore are not true position detection devices. In other words, a light beam interrupter system, for example Lind U.S. Pat. No. 4,822,996, detects an interruption in the light beam anywhere in the linear axis defined to extend from the light emitting source to the light receiving detector, and cannot differentiate the position of the interruption along that linear axis. A heat sensing device may be able to detect on multiple axes, but unless the temperature of the intruding object is constant, the point of detection varies with the temperature of the object, and therefore true position detection cannot be achieved.

SUMMARY OF THE INVENTION

The present invention overcomes the disadvantages of the prior art devices by using the concept of triangulation and simplifies the circuitry by using inexpensive, discrete components to digitize the light beam of the triangulation position detection device. The present invention uses a light beam produced by a transmitter mounted at a given angle in the same plane as a receiver. The receiver is mounted in the plane at the same given angle such that the transmitter and receiver have lines of projection and reflection, respectively, which form a target intercept point at a given distance from the mounting plane. The transmitter, receiver, and target intercept point form the three corners of the triangle which forms the basis for the triangulation concept. A light transmitter typically has a radiation pattern with an amount of light beam diffusion forming a cone-shaped light beam. The radiation pattern can be controlled by recessing the transmitter in an orifice to control the size of the cone-shaped light beam. Similarly, the receiver can be recessed to receive a given amount of light. Recessing the transmitter and receiver creates a position target window having a volumetric shape of two intersecting cones having a given size formed by the cone-shaped light beam emitted by the transmitter intersecting the conical outline of the reflected light beam to the receiver. The target window contains the target intercept point.

In operation, when an object enters the spherical target window a portion of the emitted light beam is reflected in the direction of the receiver and the more the object occupies the volumetric target window, the greater the portion of light beam is reflected into the receiver. When the object passes the target intercept point and is sufficiently within the volumetric target window, enough of the emitted light beam is received by the receiver for the control circuitry to recognize that an object is in position. In this manner, the present invention is said to detect the presence of an object on three axes. That is, if an object is too far to the right or too far to the left (X-axis), too high or too low (Z-axis), too close or too far (Y-axis), the object will not be sufficiently within the volumetric target window and will not be detected.

The present invention is implemented using a digitized, or pulsed, light beam which eliminates the need of a microprocessor and allows the system to ignore errant and stray light beams. The system includes a clock which activates the transmitter to emit a pulse of light equal in time to the pulse width created by the clock. This allows the control circuitry to ignore any errant and stray light received by the receiver when the transmitter is not emitting the pulse of light. The control circuitry includes an amplifier and a signal strength detector to ensure that the object occupies a majority of the spherical target window. A synchronous checker functions to ignore all light received while the transmitter is not emitting a pulse of light.

The system can be used for a beverage and/or ice dispensing unit wherein a delay can be provided to not only ensure that a cup is adequately in place under the dispenser, but also to eliminate nuisance dispensing. The system then activates the dispenser until the cup is no longer sufficiently within the volumetric target window wherein the control is instantly disabled.

The triangulation position detection device disclosed is implemented with discrete circuitry, however, the system may easily be adapted into a microprocessor based circuit and implemented via software. A flow chart is provided for this purpose. Additional benefits and advantages of the present invention will become apparent from the subsequent detailed description of the preferred embodiment, the drawings, and the claims.

BRIEF DESCRIPTION OF THE DRAWINGS

FIG. 7 is a timing diagram of a system in accordance with the invention.

DETAILED DESCRIPTION OF THE PREFERRED EMBODIMENT

Figure 1:
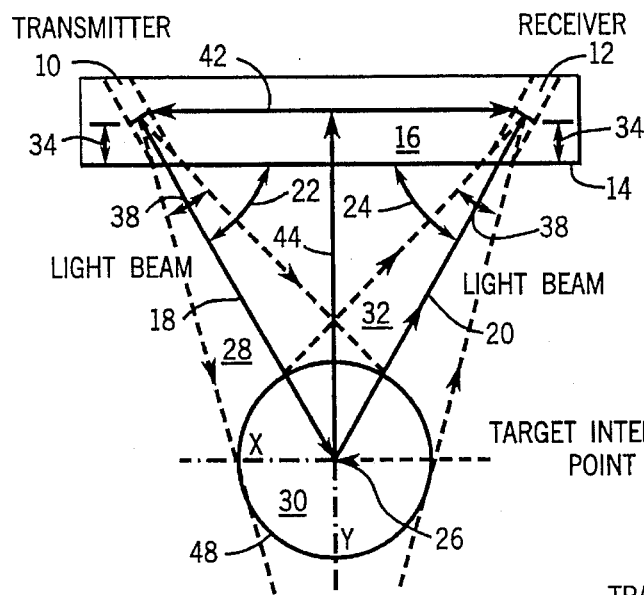
FIG. 1 is a schematic illustration in top plane view of a system in accordance with the invention.

Referring to FIG. 1, transmitter 10 and receiver 12 are mounted in plane 14 of mounting block 16. Transmitter 10 and receiver 12 are orientated in mounting block 16 such that an axis of projection 18 of transmitter 10 and an axis of reflection 20 of receiver 12 are 45° to plane 14 of mounting block 16 as shown by angles 22 and 24. Axes of projection and reflection 18 and 20 converge at target intercept point 26 which defines a point above which a dispensing spigot (not shown) is located to dispense beverages, ice, or any other type of dispensable product. Light beam 28 emitted from transmitter 10 has a cone-shaped radiation pattern which defines volumetric target window 30 such that when a container 48, for example a cup, glass, or other beverage holder, is placed within volumetric target window 30, at least a portion of light beam 28 is reflected toward receiver 12 as reflected light 32 having a cone-shaped sensing pattern.

FIG. 1 shows the general concept behind triangulation position detection wherein an object placed within volumetric target window 30 reflects at least a portion of the emitted light beam 28 from transmitter 10 toward receiver 12. The more an object occupies target window 30, the larger the portion of light beam 28 is reflected into receiver 12. This forms the basis for the triangulation theory of position detection. In other words, as an object begins to enter target window 30, only a small portion of light beam 28 is reflected off the object and toward receiver 12. The intensity of reflected light beam 32 increases as more of the object occupies target window 30. Preferably, when the leading edge of the object passes intercept point 26, the dispenser is activated by the intensity of reflected light beam 32.

Figure 2:
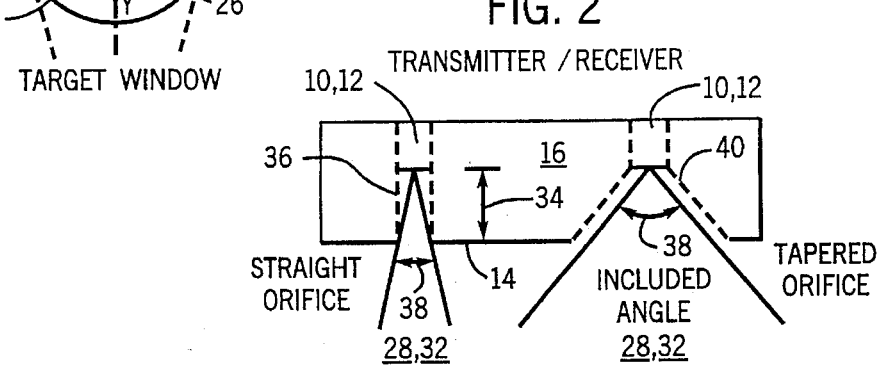
FIG. 2 is a schematic in top plane view of various mounting arrangements for a portion of the system of FIG. 1.

Transmitter 10 and receiver 12 are recessed in mounting block 16 a recessed distance 34 for controlling the radiation pattern. As shown in FIG. 2, the preferred embodiment uses a straight orifice 36 which acts as a wave guide for narrowing light beam 28 emitted from transmitter 10 and reflected light 32 received by receiver 12. Recessed distance 34 controls the radiation pattern by varying included angle 38. Increasing recessed distance 34 by recessing transmitter 10 further inside mounting block 16 decreases included angle 38 which results in a smaller target window 30, FIG. 1. Reducing recessed distance 34, FIG. 2, by mounting transmitter 10 closer to plane 14 provides a larger included angle 38 which results in a larger target window 30, FIG. 1. Alternatively, a tapered orifice 40 in mounting block 16 provides similar results by machining a taper in plane 14 of mounting block 16. A wider taper provides a larger included angle 38 and a larger target window 30, FIG. 1. A narrower taper 40, FIG. 2, provides a smaller included angle 38 and a smaller target window 30, FIG. 1. Straight orifice 36 is preferred because it is simply implemented by drilling a hole in mounting block 16, whereas tapered orifice 40 requires drilling a straight orifice for transmitter 10 and receiver 12, then machining the required taper corresponding to a desired target window 30, FIG. 1. Straight orifice 36 is also preferred because included angle 38 and the resulting target window size may be easily altered by simply adjusting recessed distance 34 of transmitter 10 and receiver 12. By testing the system with various containers, it was found that a preferred included angle 38 of 10° provided a target window 30, FIG. 1, which accommodates a majority of beverage cup sizes.

As previously described, the size of target window 30, FIG. 1, is generally dependent upon included angle 38, FIG. 2, and recessed distance 34; however, target intercept point 26 is defined by mounting angles 22 and 24 in combination with mounting distance 42 and since light beam 28, FIG. 1, is cone-shaped, varying target intercept point 26 has a corresponding effect on the size of target window 30. Mounting distance 42 is the distance transmitter 10 and receiver 12 are mounted apart from one another in mounting block 16. As can be seen in FIG. 1, holding mounting distance 42 constant and decreasing mounting angles 22 and 24 brings target intercept point 26 closer to mounting block 16 and decreases target intercept distance 44 which also decreases the size of target window 30. Conversely, increasing mounting angles 22 and 24 increases target intercept distance 44 and extends target intercept point 26 further away from mounting block 16 also increases the size of a target window 30. Similarly, holding mounting angles 22 and 24 constant and increasing mounting distance 42 increases target intercept distance 44 and extends target intercept point 26 further away from mounting block 16 which also increases the size of target window 30. Conversely, decreasing mounting distance 42, decreases target intercept distance 44 bringing target intercept point 26 closer to mounting block 16 and decreases the size of target window 30. Target window 30 is centered about target intercept point 26 and moves correspondingly. In the preferred embodiment, a preferred mounting distance 42 of approximately 2.5" with a preferred mounting angle of 45° provide a desired target intercept distance of approximately 1.75". However, these parameters are easily adjustable to acquire various target intercept distances, as previously described.

Figure 3:
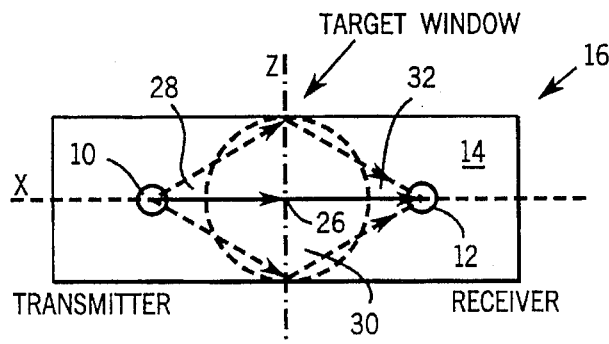
FIG. 3 is a horizontal plane view of the system of FIG. 1.
Figure 4:
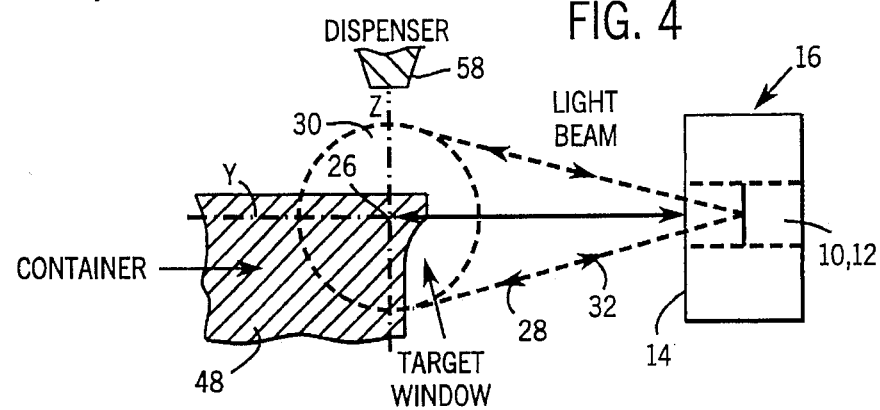
FIG. 4 is a side elevation view of the system of FIG. 1.

FIG. 3 shows a horizontal view of mounting block 16 in which transmitter 10 and receiver 12 are mounted in plane 14. While FIG. 1 shows target window 30 on a two-dimensional X-Y axis, FIGS. 3 and 4 show a third dimension of target window 30 on the Z axis. FIG. 4 shows a profile view of mounting block 16 in which light beam 28 is emitted from transmitter 10, reflected off container 48 in target window 30, and returned as reflected light beam 32 to receiver 12 in mounting block 16. When a sufficient portion of container 48 is within target window 30, the dispenser is activated to dispense product.

Figure 5:
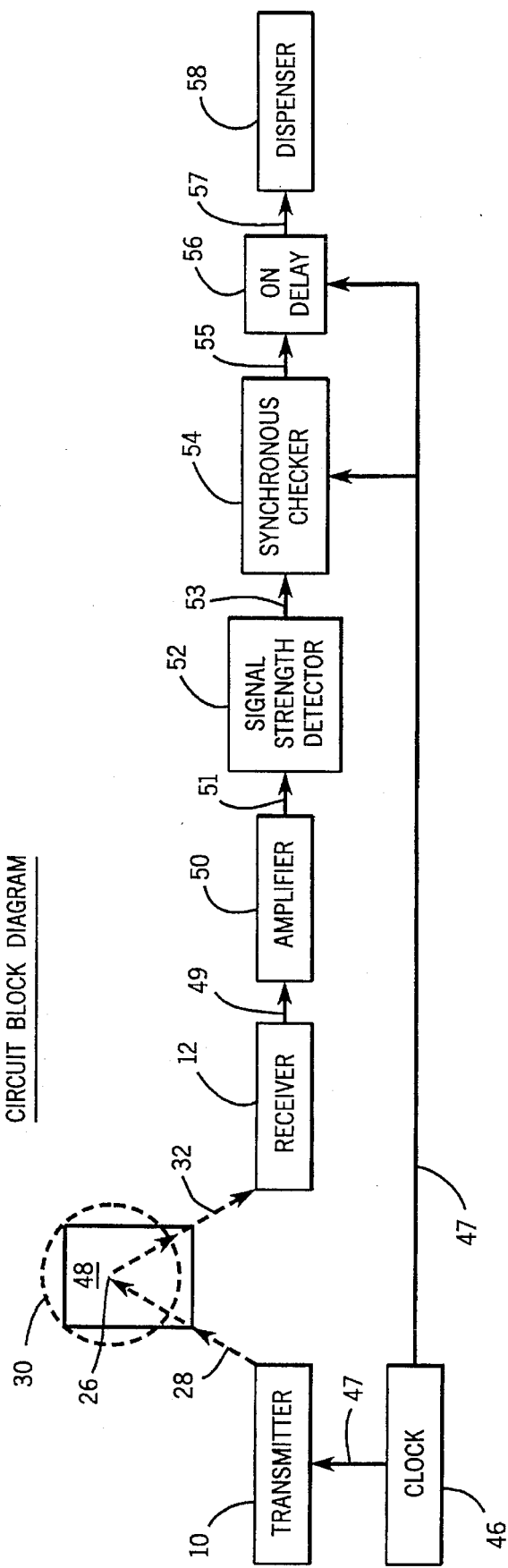
FIG. 5 is a circuit block diagram of a system in accordance with the invention.

FIG. 5 shows a block diagram of the circuit used to implement the triangulation position detection device of FIG. 1. Clock 46 is connected to transmitter 10, synchronous checker 54 and ON delay 56. Transmitter 10 emits pulse light beam 28 in response to receiving a periodic clock pulse 47 from clock 46. Pulse light beam 28 is reflected off an object, for example a cup 48, as reflected light beam 32 toward receiver 12. Receiver 12 produces a light indicative signal 49 in response to receiving pulse light beam 32. Amplifier 50 is connected to receiver 12 and amplifies light indicative signal 49. Signal strength detector 52 receives the amplified light indicative signal 51 from amplifier 50 and compares amplified light indicative signal 51 against a predetermined parameter to detect whether a sufficient amount of light beam 32 was reflected into receiver 12. Signal strength detector 52 produces a signal strength signal 53 when the amplified light indicative signal 51 is greater than the predetermined parameter, and the synchronous checker 54 determines whether the signal strength signal 53 occurs substantially synchronously with the periodic clock pulse from clock 46. Synchronous checker 54 ensures that the light received in receiver 12 was indeed produced by transmitter 10 and produces a synchronous signal 55 in response. The synchronous signal 55 is received by ON delay 56 which is connected to clock 46 and dispenser 58, and delays activating dispenser 58 to ensure that container 48 has passed target intercept point 26 and occupies a majority of target window 30. In the preferred embodiment, it was found that a 100 millisecond delay was sufficient to ensure that the edge of cup 48 has passed target intercept point 26, which avoids spilling dispensed product over the leading edge of cup 48. ON delay 56 creates dispensing signal 57 to activate dispenser 58.

Figure 6:
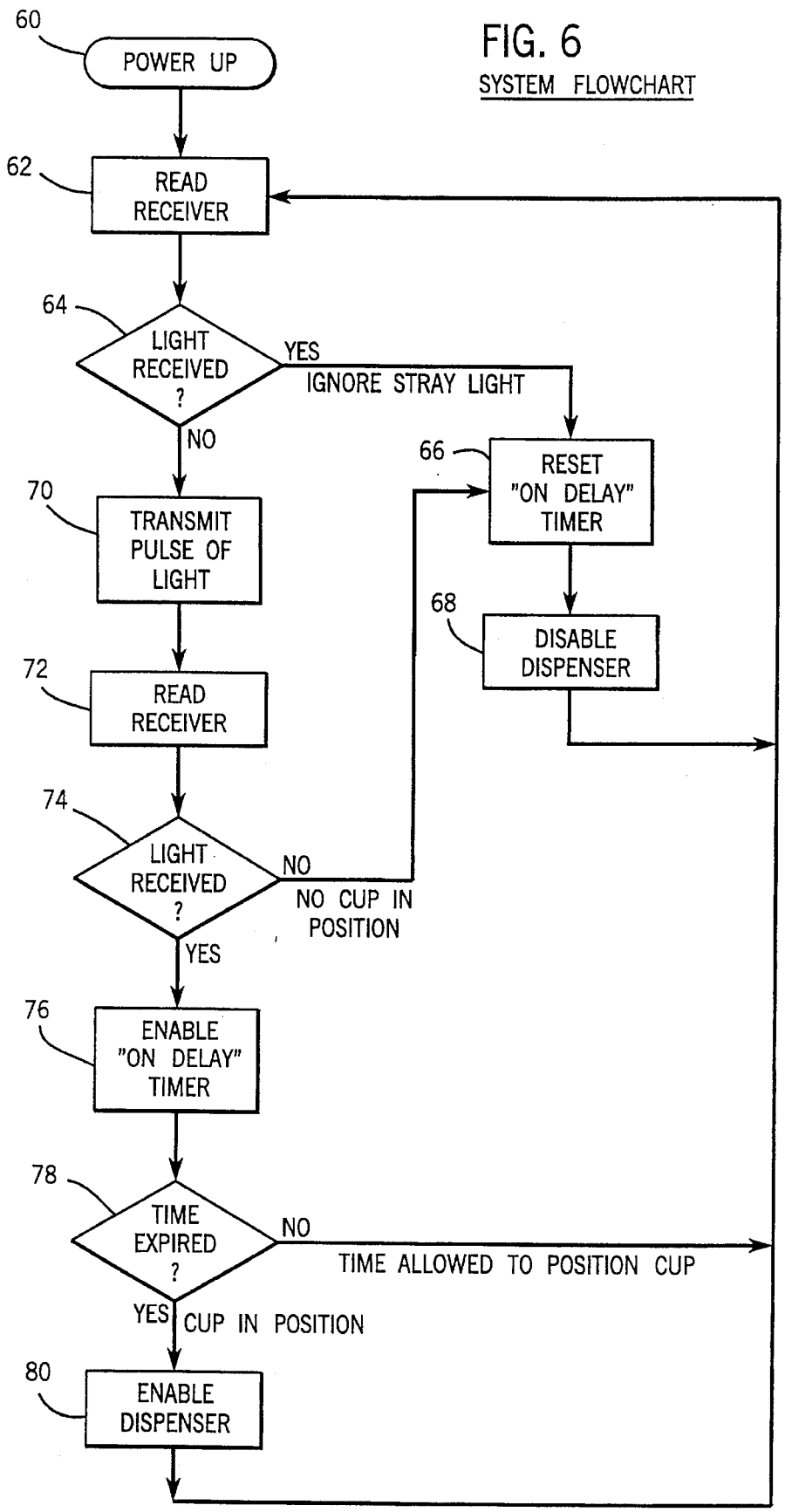
FIG. 6 is a system flow chart in accordance with the invention.

FIG. 6 is a system flow chart of the triangulation position detection device which would guide implementing the device with a microprocessor and software. At power up 60 the receiver is read 62 and checked to see if light is received 64. If light is received, it is interpreted as stray light and ignored by the system by resetting the ON delay timer 66 and disabling the dispenser 68 to ensure the dispenser is deactivated. The system then reads the receiver 62 again, ensures that no stray light is received 64, and transmits a pulse of light 70. The receiver is read 72, and a determination is made as to whether a sufficient amount of light is received 74. An insufficient amount of light received is an indication that the cup is not yet in position or a stray light signal was received. In those cases, the ON delay timer is reset 66, the dispenser is disabled 68, and the loop is started again by reading receiver 62. If sufficient light is received 74, the ON delay timer is enabled 76. The loop is repeated until the desired delay time is expired 78 which allows enough time to position the cup sufficiently under the dispenser. When the delay time has expired 78, the cup is in position and the dispenser is enabled 80. The entire flow chart is repeated checking to make sure that the cup stays in position while dispensing. If a pulse of light is transmitted 70 but not sufficiently received 72, 74, the ON delay timer is reset 66 and the dispenser is immediately disabled 68 which provides an instant OFF when the cup is no longer sufficiently in target window 30, FIG. 1.

FIG. 7 shows a timing diagram with various examples of operation. Clock (46) produces periodic clock pulses 47 having a period of 2 ms. and a pulse width of 150 μs. Clock (46) enables transmitter (10) which provides a pulse of light 32 with the same periodicity as clock pulses 47. Transmitter (10) has a time of emission equal to the clock pulse width. The transmitter produces a pulse of light 32 substantially equal in time to the clock pulse 47 produced by the clock. Receiver (12) produces light indicative signals 49 when light is received. Signal strength detector (52) shows signal strength signals 53 coinciding with light indicative signals 49 only when light indicative signals 49 are greater than a predetermined parameter. For example, light indicative signal 49a is not greater than the predetermined parameter and therefore no corresponding signal strength signal 53 is shown. Light indicative signal 49a may indicate the preference of a stray or errant light source. Synchronous checker 54 has synchronous signals 55 only when the signal strength signals 53 are substantially synchronous with the periodic clock pulses 47. For example, signal strength signal 53a corresponding to light indicative signal 49b is not synchronous with any clock pulse 47 and therefore does not have a corresponding synchronous signal. Dispenser (58) receives dispensing signal 57 which is delayed 100 ms. from the first occurrence of a synchronous signal 55. Dispensing signal 57 has an ON pulse width dependent upon the reoccurrence of synchronous signals 55. ON delay 56, FIG. 5, holds dispenser 58 in the enable mode until a clock pulse 47, FIG. 7, occurs in the absence of a synchronous signal 55, at which point dispensing pulse 57 goes low disabling dispenser (58).

The method and device of the present invention is not limited to any particular light source but is functional with any electromagnetic radiation in the optical wavelength range including infrared, visible, and ultraviolet. The preferred embodiment uses an infrared transmitter and receiver because they are very reliable, readily available, long lasting, and relatively inexpensive.

We claim:

1. An automatic dispenser control which detects when a container is in a desired position and activates a dispenser comprising:

a clock producing constant periodic clock pulses;

a transmitter having an input and an output, said input receiving the periodic clock pulses and the output emitting pulses of light responsive thereto along an axis of projection;

a receiver having a light sensing input receiving the light pulses along an axis of reflection, said receiver having an output providing a light indicative signal;

the transmitter and receiver being orientated in a common plane and having said axes of projection and reflection extending out of said common plane and converging to a target intercept point associated with the desired position;

a synchronous checker producing a signal only when a light indicative signal resulting from a given emitted light pulse occurs substantially synchronously with the periodic clock pulse causing the given emitted light pulse from the transmitter; and wherein the production of the signal indicates the container is in position and activates the dispenser, and the absence of the signal indicates the container is no longer in position and deactivates the dispenser.

2. The control of claim 1, further comprising a signal strength detector receiving the light indicative signal generated by the receiver and producing a signal strength signal when the light indicative signal bears a predetermined relationship to a predetermined parameter, and wherein the synchronous checker is further defined as producing a synchronous signal when the signal strength signal occurs substantially synchronously with the periodic clock pulse.

3. The control of claim 1 wherein said transmitter emits pulses of light having the same periodicity as the clock pulses.

4. The control of claim 1 wherein said clock pulses have a pulse width and wherein said transmitter emits pulses of light having a time of emission equal to the pulse width of the clock pulses.

5. The control of claim 1 wherein said transmitter and receiver are mounted so that said axes of projection and reflection each subtend a mounting angle measured from said common plane, the mounting angle being selected to establish the target intercept point with respect to the common plane.

6. The control of claim 5 wherein the transmitter and receiver are mounted such that the mounting angle of the transmitter is equal to the mounting of angle of the receiver.

7. The control of claim 6 wherein the transmitter and receiver are mounted such that the mounting angle is 45°.

8. The control of claim 1 wherein the transmitter and the receiver are mounted a mounting distance apart in said common plane, the mounting distance being selected to establish the target intercept point with respect to the common plane.

9. The control of claim 1 wherein the transmitter is a light emitting diode.

10. The control of claim 1 wherein the receiver is a photo sensitive transistor.

11. The control of claim 1 wherein said transmitter provides pulses of light having a radiation pattern and said receiver sensing the pulses of light within a sensing pattern, wherein the radiation pattern and the sensing pattern are measured by an included angle and wherein the radiation and sensing patterns define a position target window containing the target intercept point and having a size dependent on the radiation and sensing patterns.

12. The control of claim 11 wherein the transmitter has a cone shaped radiation pattern and the receiver has a cone shaped sensing pattern and wherein the target window is a volumetric shape of two intersecting cones.

13. The control of claim 11 wherein said transmitter and receiver are positioned to control the included angle forming a target window of desired size.

14. The control of claim 11 wherein at least one of the transmitter and receiver is situated in an orifice to reduce the included angle thereby focusing the radiation and sensing patterns.

15. The control of claim 14 wherein at least one of the transmitter and receiver is recessed in a straight orifice.

16. The control of claim 14 wherein at least one of the transmitter and receiver is situated in a tapered orifice.

17. A triangulation position detector for detecting the presence of an object within a predetermined target window comprising:

a clock producing constant periodic clock pulses;

a transmitter having an input and an output, said input receiving the periodic clock pulses and the output emitting pulses of light responsive thereto along an axis of projection;

a receiver having a light sensing input receiving the light pulses along an axis of reflection, said receiver having an output providing a light indicative signal;

a synchronous checker producing a signal only when a light indicative signal resulting from a given emitted light pulse occurs substantially synchronously with the periodic clock pulse causing the given emitted light pulse; and wherein the production of the signal indicates the object is in position, and the absence of the signal indicates the object is no longer in position.

18. The detector of claim 17 wherein the transmitter and receiver being orientated in a common plane and having said axes of projection and reflection extending out of said common plane and converging to a target intercept point associated with the desired position.

19. The detector of claim 17 further comprising a signal strength detector receiving the light indicative signal generated by the receiver and producing a signal strength signal when the light indicative signal bears a predetermined relationship to a predetermined parameter, and wherein the synchronous checker is further defined as producing a synchronous signal when the signal strength signal occurs substantially synchronously with the periodic clock pulse.

20. The detector of claim 17 wherein said transmitter emits pulses of light having the same periodicity as the clock pulses.

21. The detector of claim 17 wherein said clock pulses have a pulse width and wherein said transmitter emits pulses of light having a time of emission equal to the pulse width of the clock pulses.

22. The detector of claim 18 wherein said transmitter and receiver are mounted so that said axes of projection and reflection each subtend a mounting angle measured from said common plane, the mounting angle being selected to establish the target intercept point with respect to the common plane.

23. The detector of claim 22 wherein the transmitter and receiver are mounted such that the mounting angle of the transmitter is equal to the mounting angle of the receiver.

24. The detector of claim 23 wherein the transmitter and receiver are mounted such that the mounting angle is 45°.

25. The detector of claim 18 wherein the transmitter and the receiver are mounted a mounting distance apart in said common plane, the mounting distance being selected to establish the target intercept point with respect to the common plane.

26. The detector of claim 17 wherein the transmitter is a light emitting diode.

27. The detector of claim 17 wherein the receiver is a photo sensitive transistor.

28. The detector of claim 17 wherein said transmitter provides pulses of light having a radiation pattern and wherein the radiation pattern defines a position target window containing the target intercept point and having a size dependent on the radiation pattern.

29. The detector of claim 28 wherein the transmitter has a cone shaped radiation pattern and the target window is a volumetric shape of two intersecting cones.

30. The detector of claim 28 wherein said transmitter is positioned to control the radiation pattern forming a target window of desired size.

31. The detector of claim 28 wherein one of the transmitter and receiver is situated in an orifice to reduce the included angle thereby focusing the radiation and sensing patterns.

32. The detector of claim 31 wherein the transmitter is recessed in a straight orifice.

33. The detector of claim 31 wherein the transmitter is situated in a tapered orifice.

34. A method of detecting the presence of a container under a dispensing spigot and automatically dispensing a product into the container in response to container detection, said method comprising the steps of:

arranging a transmitter and a receiver in a common plane so that an axis of projection of the transmitter and an axis of reflection of the receiver converge at a target intercept point in a target window;

producing constant periodic clock pulses;

emitting pulses of light from the transmitter in response to the periodic clock pulses;

placing the container within the target window to reflect at least a portion of the pulses of light toward the receiver;

receiving the reflected pulses of light at the receiver and creating responsive light indicative signals;

producing a signal only when a light indicative signal resulting from a given emitted light pulse occurs substantially synchronously with the periodic clock pulse causing the given emitted light pulse; and activating a dispenser in response to the signal and deactivating the dispenser in response to the absence of the signal.

35. The method of claim 34 further comprising the step of delaying the synchronous signal for a given period of time to ensure the container is in place below the dispensing spigot.

36. The method of claim 34 further comprising the step of comparing the light indicative signal to a predetermined parameter for producing a synchronous signal when the light indicative signal bears a predetermined relationship to the parameter to ensure the container is sufficiently within the target window.

37. The method of claim 34 further comprising the step of amplifying the light indicative signal.

38. The method of claim 37 further comprising the step of comparing the amplified light indicative signal to a predetermined parameter for producing a synchronous signal when the amplified light indicative signal bears a predetermined relationship to the parameter to ensure the container is sufficiently within the target window.

39. The method of claim 34 further comprising the steps of narrowing a radiation pattern of the pulse of light by recessing at least one of the transmitter and receiver in a mounting block.

40. The method of claim 34 wherein the target window has a volumetric shape of two intersecting cones and the presence of the container is detected with respect to three intersecting and orthogonal axes.

41. A method of detecting the presence of an object comprising the steps of:

arranging a transmitter and a receiver in a common plane so that an axis of projection of the transmitter and an axis of reflection of the receiver converge at a target intercept point in a target window;

producing constant periodic clock pulses;

emitting pulses of light from the transmitter in response to the periodic clock pulses;

placing the object within the target window to reflect at least a portion of the pulses of light toward the receiver;

receiving the reflected pulses of light at the receiver and creating responsive light indicative signals;

producing a signal only when a light indicative signal resulting from a given emitted light pulse occurs substantially synchronously with the periodic clock pulse causing the given emitted light pulse;

indicating the presence of the object in response to the signal; and resetting said indication whenever a light indicative signal occurs other than substantially synchronously with a periodic clock pulse.

42. The method of claim 41 further comprising the step of comparing the light indicative signal to a predetermined parameter to ensure the object is sufficiently within the target window.

43. The method of claim 41 further comprising the step of narrowing a radiation pattern of the pulse of light by recessing at least one of the transmitter and the receiver.

44. The method of claim 41 wherein the target window has a volumetric shape of two intersecting cones and the presence of the container is detected with respect to three intersecting and orthogonal axes.

* * * * *

UNITED STATES PATENT AND TRADEMARK OFFICE
CERTIFICATE OF CORRECTION

PATENT NO.   : 5,550,369
DATED        : August 27, 1996
INVENTOR(S)  : Skell, Daniel G, et al.

It is certified that error appears in the above-indentified patent and that said Letters Patent is hereby corrected as shown below:

Column 4, line 47, delete "also" and replace with -- which --;
Column 6, lines 16-17, delete "preference" and replace with -- presence --.

Signed and Sealed this

Thirteenth Day of May, 1997

Attest:

BRUCE LEHMAN

*Attesting Officer*     *Commissioner of Patents and Trademarks*